July 27, 1937.   C. B. GRAY   2,088,202
METAL CUTTING MACHINE
Filed March 9, 1936   4 Sheets-Sheet 1

INVENTOR
CHARLES B. GRAY.
BY 
ATTORNEY

July 27, 1937.   C. B. GRAY   2,088,202
METAL CUTTING MACHINE
Filed March 9, 1936   4 Sheets-Sheet 2

INVENTOR
CHARLES B. GRAY.
BY
ATTORNEY

July 27, 1937.  C. B. GRAY  2,088,202

METAL CUTTING MACHINE

Filed March 9, 1936  4 Sheets-Sheet 3

INVENTOR
*Charles B. Gray.*
BY
*a. B. Ravis*
ATTORNEY

Patented July 27, 1937

2,088,202

UNITED STATES PATENT OFFICE 2,088,202

METAL CUTTING MACHINE

Charles B. Gray, Milbourne, Pa.

Application March 9, 1936, Serial No. 67,954

19 Claims. (Cl. 164—47)

My invention relates to cutting machines of reciprocatory punch type and it has for an object to provide improved apparatus of this type.

A nibbling or cutting machine, having punch front and side cutting faces is particularly advantageous in rapidly following a straight line. The type of machine having a roller die is very satisfactory for this type of tool, rollers being used to control the feed of material. In accordance with present invention, I provide a machine with the same type of punch tool and having the same operating advantages but having a conventional type of die and a pilot for limiting feed, with the result that the machine is mechanically simpler and more economical to construct.

A further object of my invention is to provide a pivoted pilot to limit feed and which is so related to the punch that, on working strokes, the punch deflects the pilot backwardly or wipes by the latter.

A further object of my invention is to provide a pilot formed separately from the punch with a mounting for the pilot providing for retraction of the latter.

A further object of my invention is to provide an improved die head carrying the die and the pilot.

A further object of my invention is to provide the die head with means for holding the die in such manner that the latter is firmly held but at the same time which provides for ready removal of the die.

A further object of my invention is to provide ram and die heads with rotarily adjustable rams and die holders therein together with improved means for securing simultaneous turning thereof.

A further object of my invention is to provide a cutting machine with an angularly adjustable tool having improved locking or holding means.

A further object of my invention is to provide a cutting machine having a die carried by a die head with a pilot arranged interiorly of the head so as normally to extend above the top surface of the die together with means carried by the head and providing for retraction of the pilot.

These and other objects are effected by my invention as will be apparent from the following description and claims taken in connection with the accompanying drawings, forming a part of this application, in which:

Fig. 13 is a sectional view showing a modified tool holder construction for use with the general type of apparatus shown in Fig. 11; and, Fig. 14 is a bottom plan view of the apparatus shown in Fig. 13.

Figures 1, 2, 3, 4:
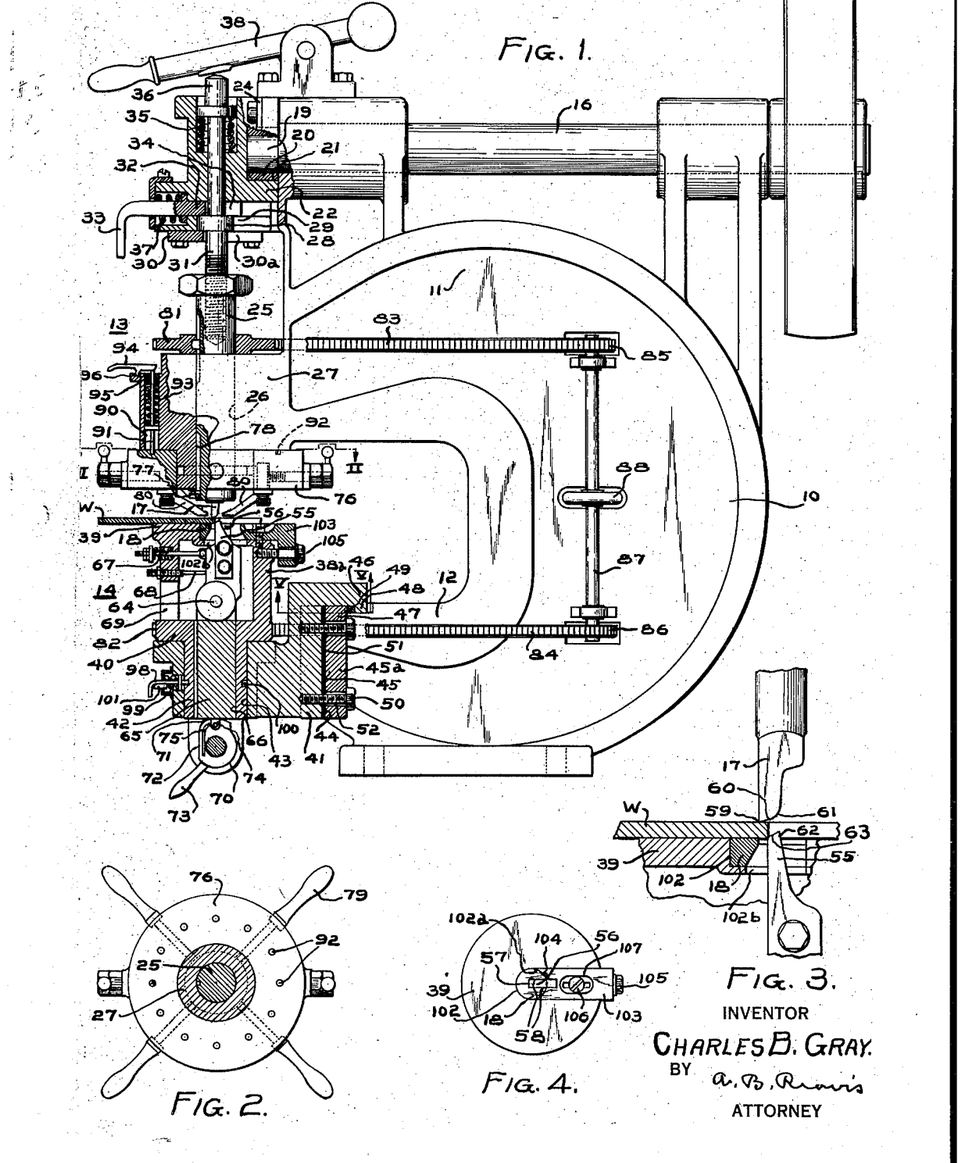
Fig. 1 is a side elevation of a cutting machine with parts in section and having my improvements applied thereto.
Fig. 2 is a detail sectional view taken along the line II—II of Fig. 1 and viewed in the direction of the arrows.
Fig. 3 is a detail view, drawn to larger scale and showing features of the tool and pilot.
Fig. 4 is a plan view of the die head and die.

Referring now to the drawings, in Fig. 1, there is shown a frame 10 of conventional type having upper and lower arms 11 and 12, carrying cutting tool and die heads, at 13 and 14, respectively.

The upper arm 11 carries a power shaft 16 for imparting reciprocatory movement to the cutting tool 17 cooperating with the die 18 carried by the die head 14, it being necessary to convert rotary motion of the power shaft into reciprocatory motion and to apply the latter to the tool. By way of example, I show the power shaft provided with an eccentric 19 engaging a block shoe 20 fitting a transverse groove 21 provided in a cross-head 22 fitting a vertical guide 23 (Fig. 6) provided on the cutter head, at 13, the cross-head being retained in position by the overlapping facing strips 24. The cross-head is connected to the ram 25 fitting the vertical ram guide bore 26 provided in the cutter or tool head body 27, the ram having the tool 17 connected thereto in any suitable manner.

As shown in Fig. 1, the cross-head 22 is connected to the ram 25 in such a manner as to permit the latter to be turned about its vertical or longitudinal axis and also means is provided to secure quick over-all shortening of the crosshead and ram aggregate to permit elevation of the tool above the work for any desired purpose even with the machine in operation. To provide for turning of the ram relatively to the crosshead 22, the ram is provided with a swivel head 28 disposed in a socket 29 carried by the crosshead, the socket being comprised in part by the bottom plate 30 detachably connected to the lower end of the cross-head, the plate having a U-shaped slot 30a formed therein to receive the shank 31 of the swivel head so that the bottom plate abuts underneath the swivel head. The upper surface of the swivel head is normally engaged by a gag 32, the gag and the bottom plate closely confining the swivel head vertically with respect to the cross-head and serving to impart movements of the latter in opposite directions to the swivel head and the connected ram. If the gag is withdrawn, obviously the swivel head and the connected ram may move upwardly relatively to the cross-head.

The gag 32 is provided with a hand pull 33 for withdrawing it to clear the swivel head 28, the gag preferably having a semi-circular or U-shaped recess 34 at its inner end capable of fitting about the cylindrical exterior of the swivel head. As soon as the gag is retracted to such an extent that the swivel head may move through the recess, it does so under influence of the force of the spring 35 acting on the pull rod 36 connected to the swivel head. The gag is normally biased inward by a spring 37, with the result that, if the swivel head and ram are moved downwardly relatively to the cross-head until the swivel head engages the bottom plate 30, the spring 37 snaps the gag inwardly above the swivel head just as soon as it is cleared by the recess 34. A convenient way of effecting this movement is by means of the weighted lever 38, which, when pulled down, imparts downward movement to the pull rod 36 and compresses the spring 35.

Referring now to the die head 14, as shown in Fig. 1, this structure is comprised by an upper or body portion 38a provided with a top plate 39 carrying the die 18 and a bottom plate 40 abutting the bracket 41 so as to transmit cutting thrust to the latter. The housing or body portion 38a has depending therefrom the hollow spindle or journal 42 fitting a vertical guide bearing 43 provided in the supporting bracket or structure 41.

The supporting bracket or structure 41 is detachably connected with respect to the frame, not only to facilitate manufacture thereof and associated parts, but also to provide for alinement of the die and tool. The connection must furthermore be of such a character as to solidly transmit cutting stresses to the frame and its support. Accordingly, I show the bracket 41 having an upright face 44 opposed to an upright face 45 formed on the frame and provided with a hook portion 46 for engagement over the frame flange 47, the hook portion having a flange 48 engaging behind the latter. Adjustable wedge or wedges 49 are preferably arranged between the flanges to draw the face 44 toward the face 45, and screws 50 are employed for clamping or fastening the bracket in position relatively to the frame, the stresses due to weight of the bracket as well as load imposed thereon being transmitted largely through the hook and wedge connection so that the screws serve mainly clamping and positioning functions. Shims 51 are preferably arranged between the faces 44 and 45 and the screws 50 extend through openings 52 formed in the end plate 45a of the lower arm and larger than the screw shanks. Hence the means for connecting the bracket provides for adjustment horizontally in directions at right angles so that the die may be alined with the tool. Shims 51 may be removed or inserted and screws tightened to secure adjustment in one direction; and with the wedges and screws loosened the bracket may be moved horizontally in the other direction to the extent permitted by excess size of the openings 52 relatively to the screws 50. After the die is correctly positioned in this way, the wedges 49 (Fig. 5) are tightened, each wedge being forced in between suitable opposed surfaces formed on the frame and hook flanges 47 and 48, screws 53 carried by the flange 48 engaging the wedges for this purpose. Thus it will be seen that the shims 51, the screws 50 and the surfaces 44 and 45 provide for adjustment of the bracket 41 horizontally at right angles, while the flange on the bracket overhanging the frame flange with the interposed wedges serves to transmit cutting stresses from the die to the frame.

Because of the type of tool 17 and the character of pilot 55, the die 18 has a slot 56 having its inner end providing a front shear edge 57 and having its sides providing side shear edges 58 arranged at right angles to the edge 57. The tool 17 is provided with a front cutting edge 59 and side cutting edges 60, and the tool and die are formed so that the front and side edges of the tool cooperate with the front and side edges of the die to effect cutting.

The tool 17 is provided with a bottom face 61 which recedes upwardly and rearwardly to provide a desired rake for the front cutting edge 59 and for scissors-like shearing action for the side cutting edges 60. The pilot 55 has its upper end provided with a feed limiting portion 62 immediately above the die and with a portion 63 thereabove which is inclined upwardly and rearwardly so that the tool in moving down is capable of moving the pilot backwardly, whereby the tool may wipe past the pilot.

The pilot 55 is pivoted at 64 to the upper end of the stem 65 slidable in the bore 66 formed in the spindle 42. A spring 67 biases the pilot toward the front shearing edge 57 of the die to engage the adjustable abutment 68. By adjustment of the abutment 68, the distance between the pilot feed limiting portion 62 and the shearing edge 57, and, therefore, the increment of feed for work, shown at W in Figs. 1 and 3, may be varied. As a slug is sheared from the blank it spreads backwardly, the pilot moving backwardly readily to permit this, and, as cutting is completed, the slug is pushed or wiped along the pilot so as to drop into the housing 38a from which it is discharged through the opening 69. With this arrangement and operation of the tool and pilot, it will be apparent that slugs are positively pushed out by the tool with no opportunity for their being caught or jammed between the tool and the pilot.

The pilot-supporting stem 65 may be raised to bring the pilot to its normal position or to lower it below the die incident to insertion or removal of work when making inside cuts. Accordingly, the lower end of the stem 65 engages a cam 70 pivotally carried by the spindle 42 and having high and low cam portions 71 and 72. With the cam portion 71 abutting the lower end of the stem, the pilot occupies its normal position extending above the die; and, with low portion 72 in abutment, the pilot will be below the die. The cam is moved by any suitable means, for example, the handle 73. While upward movement of the stem 65 is positively effected by the cam, yet, with the type of cam shown, other means must be used to cause the stem to lower and follow the cam; and, while gravity may suffice for this purpose, I prefer to use positive means, such as the follower 74 on the stem and engaging the cam groove 75 formed in the cam.

With the present type of tool and die, if the tool is turned, it is necessary to turn the die to the same extent. Referring first to the primary means for turning the tool, in Fig. 1, I show the tool head 13 provided at its lower end with a turret ring 76 provided with a key 77 engaging a spline groove 78 formed in the ram. The ring is turned by one or more handles 79. The ring also carries strippers 80 which serve to strip work from the tool on up or back strokes.

The ram 25 and the die head 38a are mechanically interconnected so that they turn together to keep the tool and the die in registry. To this end a sprocket 81 is splined to the ram and a sprocket 82 is connected to the die head 38a, the sprockets 81 and 82 engaging chains 83 and 84, respectively, and the latter engaging sprockets 85 and 86, respectively, carried by opposite ends of the shaft 87. The shaft 87 is preferably provided with a hand wheel 88 so that the operator may use the latter to turn the tool and die when he is near thereto and the turret ring is relatively inaccessible for this purpose.

Detents are preferably provided for holding the turret ring 76 and the die head 38a in predetermined angular positions. Accordingly, the tool or cutter head body 27 is provided with a vertical bore 90 having a detent 91 therein and adapted to engage recesses 92 formed in the top surface of the turret ring 76. A spring 93 causes the detent to engage in any of the recesses to lock the turret ring. The detent 91 has a hand pull 94 at its upper end and lock-out means is provided for holding the pin free of the recesses. For example, I show lock-out means comprised by a lug 95 on the detent and fitting a recess 96 in the body when in locking position, the means being rendered effective by pulling the pin up so that the lug clears the upper end of the recess and then turning the pin so that the lug is out of registry with the recess. This arrangement of detent for the turret ring is advantageous because of its accessibility and convenient operability.

The detent for the die head is preferably comprised by a pin 98 carried by the bracket 41 and biased by a spring 99 to engage any of the recesses 100 formed in the exterior of the spindle 42 of the die head, the angular spacing of the recesses 100 corresponding to the recesses 92 formed in the turret ring 76. Lock-out means 101, similar to that already described, is provided for holding the pin 98 out of the recesses 100.

As already pointed out, the die 17 is provided by a block having a slot formed therein to provide the shearing edges and adequate clearance for backward movement of the pilot. The die block is preferably cylindrical and fits the cylindrical end 102 of the slot 102a formed in the top plate 39 of the die head, the top plate having a flange 102b underlapping the die to give bottom and thrust-transmitting support for the latter. The die is clamped in position by means of a bar 103 having a cylindrical seat 104 at its inner end to engage the die block. The bar is moved inwardly to clamp the die block by screw means at 105, the bar being held down in the slot 102 by a screw 106 connected to the top plate and fitting a slot 107 in the bar.

Figures 5, 6, 7:
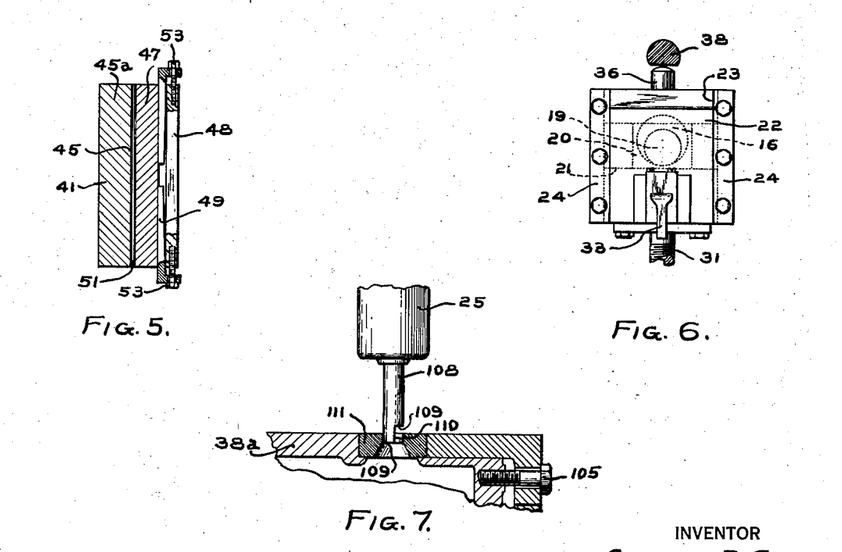
Fig. 5 is a sectional view taken along the line V—V of Fig. 1 and viewed in the direction of the arrows.
Fig. 6 is a detail end elevation of the upper portion of the cutter head of Fig. 1.
Fig. 7 shows a different type of tool and die inserted in the machine shown in Fig. 1.

The machine shown in Fig. 1 may be used with a round type of tool, as shown in Fig. 7, the ram 25 having the tool 17 replaced by a round tool 108 having cutting and pilot portions 109 and 110, this type of tool being well known in the art. Also, the die 18 which cooperates with the tool 17 in Fig. 1 is replaced by a die 111 to suit the tool 108. Since the round type of tool having cutting and pilot portions not only serves to cut material but also to limit the increment of feed thereof, the pilot 55 of Fig. 1 would be unnecessary and such pilot may be lowered out of position or removed.

Figure 8:
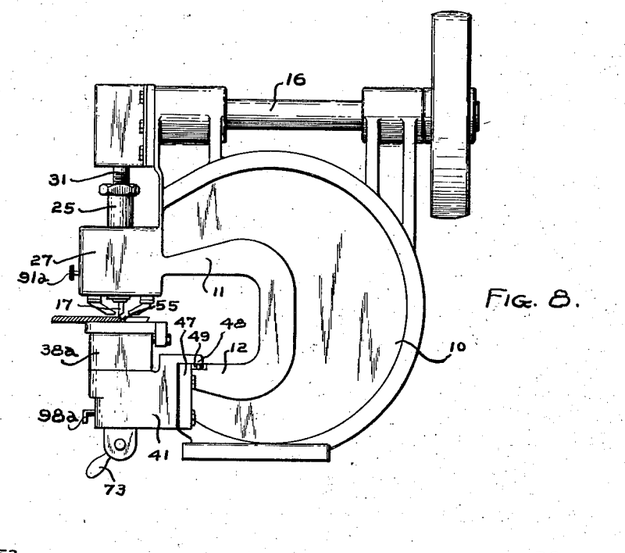
Fig. 8 shows a modified form of machine.

In Fig. 8, I show an embodiment of my invention particularly suitable for straight cutting and one in which maximum economy in construction of the machine is secured. The apparatus shown in this view is similar to that shown in Fig. 1 except that the gag 32, the turret ring 76, and the means for securing concurrent turning of the ram and of the die head, as well as auxiliary devices, have been omitted. In this form, the machine has a ram 25, as described in connection with Fig. 1, the ram carrying a tool 17 which cooperates with a die carried by the die head 38a. A pilot 55 is employed, the pilot being raised and lowered by means of the lever 73. Here again, the bracket 41 is secured to the lower arm 12 of the frame in such manner that the bracket may be adjusted horizontally at right angles in order to aline the die with the tool, cutting stresses being transmitted from the bracket flange 48 through the compression wedges 49, to the frame flange 47. Detents 91a and 98a are associated with the ram and with the die head to provide for angular adjustment thereof to predetermined positions.

Figures 9, 10, 10A:
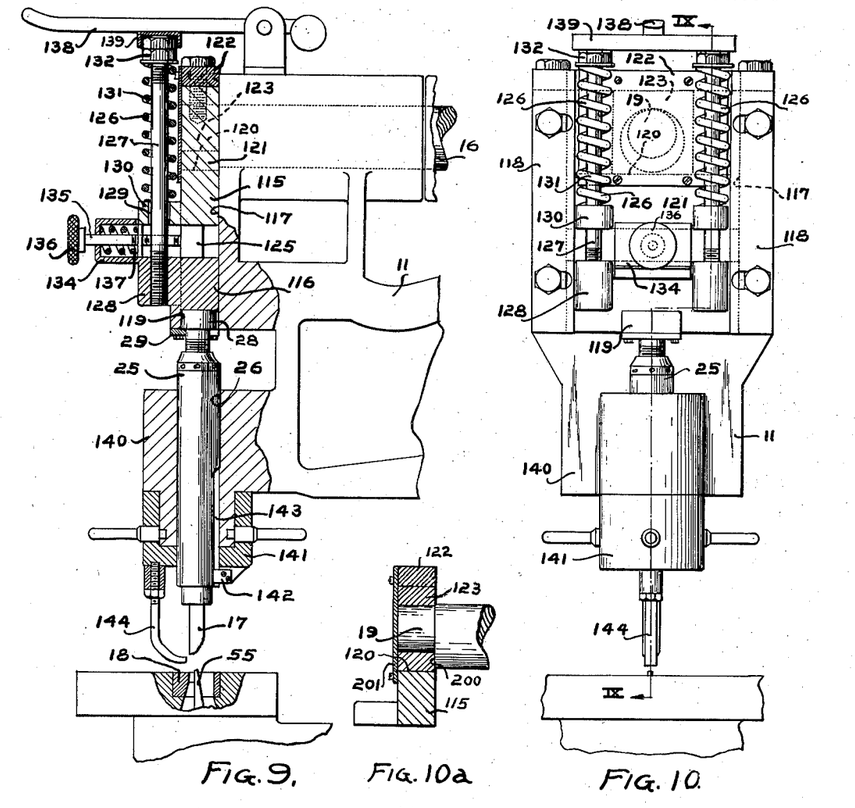
Fig. 9 is a fragmentary view shown partly in elevation and partly in section of a further embodiment of my invention.
Fig. 10 is an end elevation of the apparatus shown in Fig. 9.
Fig. 10a is a detail showing the eccentric and associated parts as provided in Figs. 9, 10, 11, and 12.

In Figs. 9 and 10, I show an embodiment of the invention which is simplified from the points of view of construction and assembly, particularly in connection with crosshead, gag and turret features. In these views the ram 25, the tool 17, the die 18, and the pilot 55 are in general similar to those shown in Fig. 1.

The crosshead in Figs. 9 and 10 includes primary and secondary, or upper and lower, parts 115 and 116 slidable in the vertical guide 117 provided at the outer end of the upper arm 11 of the machine frame and held in place by the facing strips 118. The secondary part 116 has a socket 119 at its lower end for the swivel head 28 of the ram.

The primary crosshead part 115 is formed with a transverse slot 120, the latter being preferably provided by having the body 121 constructed as an approximately U-shaped member with a strap 122 at the top thereof. A block or shoe 123 fits the slot and it is engaged by the driving eccentric 19.

The primary part 115 is connected to the secondary part through the intermediary of a gag 125 and a pair of tension devices, at 126. Each tension device, at 126, includes a rod 127 connected to a lug 128 on the secondary part 116 and extending through openings 129 in lugs 130 of the primary part 115. Springs 131 seat against the tops of the lugs, encompass the rods, and are held compressed by the nuts 132 carried by the upper ends of the rods. The tension devices serve to draw the secondary part 116 toward the primary part 115 when the gag 125 is retracted to raise the tool for the purpose already described.

Since the slide is made in upper and lower parts, with the upper part comparatively simple in design and structure and not complicated by other parts being connected thereto, it will be apparent that the upper part and the eccentric shoe carried thereby may be removed without disturbing the lower part, the gag carried thereby and other parts.

The gag 125 is carried by the lower, or secondary, crosshead part 116. To this end, the part 116 has connected thereto a box 134 through which extends the rod 135 connected to the gag, the outer end of the rod having connected thereto the hand pull 136. A spring 137 in the box 134 surrounds the rod 135 and exerts force on the gag to move the latter to position between the primary and secondary parts. Upon retraction of the gag, the secondary part moves toward the primary part under influence of the tension devices.

The secondary part 116 is moved away from the primary part 115 by means of the lever 138 having a cross bar 139 adapted to engage the upper ends of the rods 127. With the gag retracted and the secondary part elevated, if the lever 138 is pulled down, the rods 127 will be thrust downwardly and the secondary part 116 thereby be moved downwardly; and, as soon as the secondary part is moved down to a sufficient extent relative to the primary part, the gag moves in between the primary and secondary parts under influence of the spring 137.

The ram 25 is arranged in a guide bore 26 provided by the head element 140 connected to the upper arm 11. The head element 140 has journalled on its lower end the turret member 141 having a key 142 engaging in the keyway 143 of the ram. The turret member also carries a stripper 144.

Figures 11, 12:
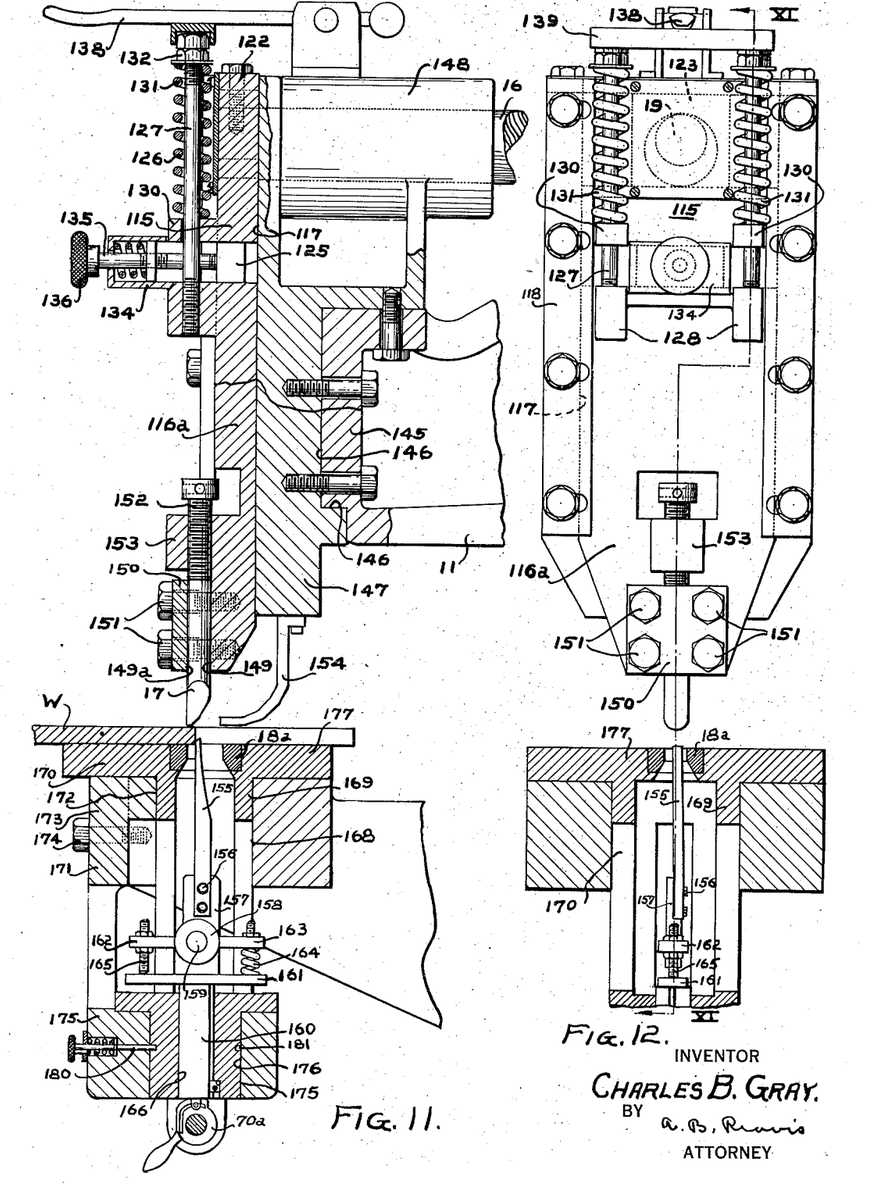
Fig. 11 is a vertical sectional view showing a further embodiment of the invention.
Fig. 12 is an end elevational view of apparatus shown in Fig. 11.
Figures 13, 14:
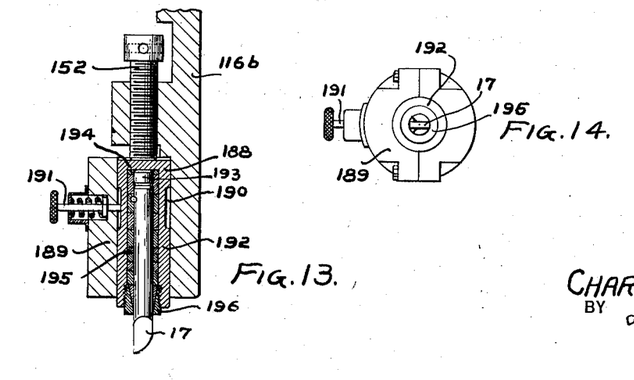

In Figs. 11, 12, and 13, I show further modified features of the invention. The crosshead construction is somewhat similar to that of Figs. 9 and 10 except that the ram and the secondary part are combined and a die holder and pilot mechanism of modified form are used.

As shown in Fig. 11, the upper arm 11 has a tongue 145 fitting a slot or groove 146 formed in the body 147 of the head construction. The body 147 carries a bearing 148 for the drive shaft 16 and it is formed to provide a guide 117 for the primary and secondary crosshead parts 115 and 116a.

The secondary part 116a serves both the purpose of the secondary part 116 of Fig. 9 and of a ram, it being sufficiently elongated for this purpose. The lower end of the secondary part or ram 116a has a tool holder formed by complementary vertical grooves 149 and 149a formed, respectively, in the lower end of the ram and in the face plate 150 connected to the ram by screws 151. Cutting thrust is transmitted from the ram to the upper end of the tool 17 by means of a screw 152 carried by a lug 153 integral with the ram.

A stripper 154 carried by the body 147 serves to strip the work W from the tool, as hereinbefore pointed out.

While the pilot 155 shown in Figs. 11 and 13 operates in a general way similarly to that of Fig. 1, the structure thereof and of associated parts has been modified. The pilot 155 is detachably connected by screws 156 to the arm 157 of the rocker 158 mounted on the pivot 159 carried by the upper end of the post 160.

The post 160 carries a plate 161 with which cooperate elements to bias the pilot forwardly and to adjust the feed increment of the pilot. To this end, the rocker 158 has opposed arms 162 and 163, a spring 164 being interposed between the arm 163 and the plate 161 to bias the pilot forwardly and an adjusting screw 165 is carried by the arm 162 and it cooperates with the plate 161 to provide for adjustment of the increment of feed.

As hereinbefore pointed out in connection with Fig. 1, provisions are made for separating the pilot from the tool incident to insertion or removal of work. To this end, in Fig. 11, the support or post 160 is formed as a slide movable vertically in the guide bore 166 by means of a cam 70a, similar in structure and function to the cam 70 of Fig. 1. Movement of the cam results in vertical movement of the pilot aggregate consisting of the pilot, the post or slide, and the connections therebetween.

With the form of the invention shown in Figs. 11, 12, and 13, it is desirable to provide for angular adjustment of the tool and die to suit the desired direction of cutting, as hereinbefore pointed out. The tool 17 may be adjusted by loosening the screws 151 and turning the tool 17 in the holder. Adjustment of the die 18a calls for special construction of the die head and its support.

Accordingly, I show the lower arm of the frame bifurcated, or having a U-shaped slot 168, at its outer end to receive the hollow cylindrical stem structure 169 of the die holder 170. A filler or strap portion 171 is connected to the lower arm and it cooperates with the slot to form a multiple-part cylindrical bearing for the upper journal portion 172 of the stem structure 169. Preferably, the filler or strap portion 171 forms a part of a depending body 173 connected to the lower arm by screws 174. The body functions as a guide or retainer for the lower end of the stem structure; and, to this end, the latter is provided with a journal portion 175 fitting a bearing 176 provided by the body.

The stem structure 169 has a work table 177 at its upper end and in abutting relation with respect to the upper surface of the lower arm, whereby working or cutting stresses are transmitted from the table to the lower arm. Furthermore, the stem structure carries the pilot aggregate, the slide 160 thereof fitting the guide bore 166 formed in the journal portion 175 of the body 173.

A detent 180 carried by the stationary body 173 cooperates with openings 181 formed in the stem structure to hold the latter and the die carried thereby in a desired position of adjustment.

In Figs. 13 and 14, I show a further modification of the combined crosshead and ram structure facilitating adjustments of the tool 17 in which the latter is carried by a tool holder 188 mounted in the cylindrical two-part bearing 189 carried by the lower end of the combined ram and secondary crosshead member 116b. The holder has longitudinal recesses 190 with which cooperate the detent 191, which may be withdrawn to permit turning of the holder and then the detent allowed to reengage to retain the holder in adjusted position. As in Fig. 11, a thrust screw 152 is carried by the ram and serves to transmit cutting thrust directly to the upper end of the holder.

The tool holder 188 is of such a character as to permit adjustment of the tool relatively thereto, this being desirable in case of a large range of adjustment due to variability in tool lengths or to shortening of tools incident to dressing of the latter. Accordingly, the tool holder is comprised by an inverted cup-shaped body or thimble 192 within which is disposed the shank of the tool, a spacer 193 of suitable length being disposed between the top end of the tool and the closed upper end 194 of the body. Washers 195 of suitable thicknesses are arranged in the body and encompass the tool and spacer to hold the latter centered. A collet 196 is carried by the lower end of the body and it serves to grip the tool.

The arrangements shown in Figs. 9 and 11 are advantageous in that they readily permit removal of the slide aggregate, or removal of the eccentric mechanism without disturbing the slide, the gag and the associated operating devices being so arranged as not to interfere.

The slide as a whole may be removed merely by displacing the retainer strips 118 sufficiently to permit outward movement of the slide.

As shown in Fig. 10a, the shoe 123 is held in place with respect to the upper part of the slide due to cooperation of the cheek surface 200 on the drive shaft and the detachable retainer plate 201 carried by the upper part 115. With removal of the plate, both the shoe 123 and the eccentric 19 are exposed so that the shoe may be removed, and the eccentric as well if the latter is provided on a short section detachable from the drive shaft proper, without disturbance otherwise of the apparatus.

From the foregoing, it will be apparent that I have devised a type of cutting machine which has the operating advantages of the roller die type but wherein the expensive construction to provide for a roller die is avoided. In the present machine, instead of having a roller die for the angular type of tool, I provide a die of ordinary construction having front and lateral shear edges cooperating with the cutting edges of the tool. In the roller die type of machine, the die rollers not only define the die but cooperate in securing feeding of material. Therefore, with the machine using an ordinary die, some means must be provided to limit the feed of material. Accordingly, I provide a pilot carried by the die head and normally extending above the upper surface of the die, the front of the pilot being spaced from the front shear edge of the die a distance corresponding to the desired increment of feed. The pilot is arranged to be deflected backwardly during cutting strokes so that the tool may move by and in front of the latter as it passes through the die, whereby there is no opportunity for chips to be crowded between the tool and the pilot and such chips are readily pushed by the tool along the front of the pilot and through the die. The present type of machine embodies means for raising and lowering the pilot, it being desirable to provide for this operation incident to making inside cuts. The present invention also includes means providing for angular adjustment of the tool and of the die to provide for change in the direction of cutting.

While I have shown my invention in several forms, it will be obvious to those skilled in the art that it is not so limited, but is susceptible of various other changes and modifications without departing from the spirit thereof and I desire, therefore, that only such limitations shall be placed thereupon as are imposed by the prior art or as are specifically set forth in the appended claims.

What I claim is:

1. In a cutting machine of the reciprocatory punch type, a punch tool, a die cooperating with the tool, means for reciprocating the tool, a pilot extending upwardly through the die and spaced from the front edge of the die when the tool is in its uppermost position to determine the increment of feed of stock, means for supporting the pilot in a predetermined vertical position during cutting strokes of the tool, and means providing for rearward and forward movements of the pilot by the tool on cutting and back strokes, respectively, of the latter.

2. In a cutting machine of the reciprocatory punch type, a punch tool, a die cooperating with the tool, means for reciprocating the tool, a pilot extending upwardly through the die and, in its normal position, spaced from the front portion of the latter a sufficient distance to provide a desired increment of feed for stock, said tool and pilot having bottom and top surfaces so arranged that the pilot is moved backwardly by the tool as each cutting operation progresses to provide for the tool moving longitudinally relatively to the pilot so that the tool may push a cut slug along the front edge of the latter and out of the die, and means for restoring the pilot to normal position as soon as it is cleared by the tool.

3. In a cutting machine of the reciprocatory punch type, a punch tool, a die cooperating with the tool, means including a drive shaft for reciprocating the tool, a pilot extending upwardly through the die and, in its normal position, spaced from the front portion of the latter a sufficient distance to provide a desired increment of feed for stock, said tool and pilot having bottom and top surfaces so arranged that the pilot is moved backwardly as each cutting operation progresses to provide for the tool moving longitudinally relatively to the pilot so that the tool may push a cut slug along the front edge of the latter and out of the die, means for biasing the pilot toward the front portion of the die, and an adjustable abutment for limiting movement of the pilot toward the front of the die.

4. In a cutting machine of the reciprocatory punch type, a punch tool, a die cooperating with the tool, means including a drive shaft for reciprocating the tool, a pilot extending upwardly through the die and, in its normal position, spaced from the front portion of the latter a sufficient distance to provide a desired increment of feed for stock, said tool having a back surface at its lower end and said pilot having a front surface at its upper end which are inclined upwardly and rearwardly so that the pilot is moved backwardly by the tool to provide for longitudinal movement of the tool relatively to the pilot, and means resisting backward movement of the pilot and effective to restore it to normal position.

5. In a cutting machine of the reciprocatory punch type, a reciprocatory punch tool, means for reciprocating the tool, a die cooperating with the tool, a pilot normally extending through and above the upper surface of the die and spaced from the forward edge of the latter to provide for a desired increment of feed of stock, means providing for rearward movement of the pilot so that the tool may move downwardly relatively to the pilot and in front of the latter on cutting strokes, means effective to restore the pilot to normal position when it is cleared by the tool on backstrokes of the latter, and means for holding the pilot in normal operating position with respect to the tool and movable to separate the pilot from the tool incident to insertion or removal of stock.

6. In a cutting machine of the reciprocatory punch type, a frame, a vertical ram, means carried by the frame for reciprocating the ram and providing for angular adjustment thereof about its vertical axis, a punch tool carried by the lower end of the ram, a die cooperating with the tool, a die head carrying the die and supported by the frame so as to be adjustable about an axis coaxial with the ram axis, a head carried by the frame and having a guide bore for the ram, a turret ring journaled on the frame head, a spline connection between the turret ring and the ram and including a key disposed below the head, a pilot carried by the die head and normally extending above the die and spaced a predetermined distance from the front edge of the latter, means providing for backward movement of the pilot as the punch tool traverses the die on cutting strokes, means for moving the pilot forwardly on back strokes of the punch tool when the latter clears the die, and mechanism interconnecting the ram and the die head for simultaneous angular adjustment and including a gear member disposed above the frame head and splined to the ram.

7. In a cutting machine of the reciprocatory punch type, a punch tool, means for reciprocating said tool, said punch tool having front and lateral cutting edges, a die having shear edges cooperating with the front and lateral cutting edges of the tool, means providing for adjustment of the tool angularly about its axis, a die head carrying the die and angularly adjustable about an axis coaxial with the tool axis, a pilot carried by the die head and normally extending above the die and spaced a predetermined distance from the front edge of the latter, means providing for backward movement of the pilot as the punch tool traverses the die on cutting strokes, and means for moving the pilot forwardly on back strokes of the punch tool when the latter clears the die.

8. In a cutting machine of the reciprocatory punch type, a punch tool, means for reciprocating the tool, a die cooperating with the tool, a die head including a body supporting the die and having an opening for exit of chips, a pilot in said body and normally extending through and above the upper surface of the die and moved backwardly by the tool on cutting strokes, abutment means for spacing the pilot from the front of the die, means for biasing the pilot forwardly to engage the abutment means, means including surfaces formed on the punch tool and on the pilot for causing the latter to move backwardly against the force of the biasing means on cutting strokes of the punch tool, a support for the pilot movable in the body, and means for lowering and raising the support to retract the pilot below the upper surface of the die and to raise the pilot from retracted to normal position.

9. In a cutting machine of the reciprocatory punch type, a punch tool, means for reciprocating the tool, a die cooperating with the tool, a die head including a body for supporting the die, a pilot in said body and normally extending through and above the upper surface of the die, the adjacent tool and pilot ends being so shaped that the pilot is moved backwardly by the tool to provide for the latter moving downwardly in front of the pilot, a support mounted in the body, a pivotal connection between the lower end of the pilot and the support, an abutment for spacing the pilot from the front edge of the die, means for biasing the pilot to engage the abutment, and means providing for movement of the support to retract the pilot below the upper surface of the die and to raise the pilot from retracted to normal position.

10. In a cutting machine of the reciprocatory punch type, a frame having upper and lower arms, a cutter head having a vertical guide, a reciprocatory ram carried by the guide, a punch tool connected to the lower end of the ram, means for reciprocating the ram, a die cooperating with the tool, a die head carrying the die, a bracket connected to the lower arm and supporting the die head, means providing for adjustment of the bracket horizontally at right angles to aline the die and tool, and means for transmitting cutting stresses from the bracket to the lower arm.

11. In a cutting machine of the reciprocatory punch type, a frame having upper and lower arms, a cutter head connected to the upper arm and provided with a vertical ram guide, a ram in the guide, means for reciprocating the ram, a punch tool carried by the lower end of the ram, a die cooperating with the tool, a head for supporting the die, a bracket for supporting the head, means providing for adjustment of the bracket horizontally at right angles to provide for alinement of the die and tool, and means for transmitting cutting stresses from the die to the lower arm including a flange on the bracket overhanging a flange on the lower arm with compression spacing means between the flanges.

12. In a cutting machine of the reciprocatory punch type, a punch tool having a front cutting edge and side cutting edges arranged normally with respect to the front cutting edge, a die having a slot providing front and side shear edges conforming to and cooperating with the tool edges, a pilot arranged in the slot and extending above the die to provide a feed stop, means for biasing the pilot toward the die front shear edge, means for spacing the pilot from the front shear edge of the die to provide for a feed increment, and means including surfaces formed on the lower end of the punch and on the upper end of the pilot for causing the pilot to move backwardly on cutting strokes of the tool to allow the tool to move down in front of the die.

13. In a cutting machine of the reciprocatory punch type, a frame having upper and lower arms, a cutter head having a vertical body provided with a vertical guide, a ram fitting the guide, means for reciprocating the ram, a punch tool carried by the lower end of the ram, a die cooperating with the tool, a die head having a central seat for the die and a radial slot opening into the seat, a key in the slot, said seat being comprised by surfaces on the head and on the end of the key which conform to and encompass the die and by a flange on the head abutting the bottom surface of the die, and means for exerting pressure on the key to secure gripping of the die.

14. In a cutting machine of the reciprocatory punch type, a frame having upper and lower arms, a cutter head connected to the upper arm and provided with a body having a vertical guide, a ram in the guide, means for reciprocating the ram, a punch tool carried by the lower end of the ram, a die having an opening for the tool and having a cylindrical exterior, a die head carried by the lower arm and having a table provided with a central seat for the die and with a slot extending from the outer edge of the table and opening into said seat, said slot opening through the top surface of the table, a key fitting the slot and having its top surface normally flush with the top surface of the table, said seat being comprised by an upright surface on the table and on the key conforming to and fitting the boundary surface of the die and by a flange on the table which abuts the bottom surface of the die, means for retaining the key in the slot, and means for exerting force on the key to grip the die.

15. In a cutting machine, a frame having a vertical guide, a slide in the guide and including upper and lower parts, means for reciprocating the upper part, a gag insertable between and retractable from between the parts, tension means tending to draw the lower part toward the upper part, a punch tool operatively connected to the lower part, and a die cooperating with the tool.

16. In a cutting machine, a frame having a vertical guide, a slide in the guide and including upper and lower parts, means for reciprocating the upper part, a gag insertable between and retractable from between the parts, tension means tending to draw the lower part toward the upper part, a punch tool operatively connected to the lower part, a die cooperating with the tool, and means for separating said parts to provide for insertion of the gag.

17. In a cutting machine, a frame having a vertical guide, a slide in the guide and including upper and lower parts, said upper part having a horizontal slot extending therethrough, a shoe slidable in the slot, a drive shaft having an eccentric engaging the shoe, a gag insertable between and retractable from between the upper and lower parts, tension means tending to draw the lower part toward the upper part, a punch tool operatively connected to the lower part, a die cooperating with the tool, and means for retaining the shoe in the slot including a cheek on the drive shaft and detachable retaining means carried by the upper part.

18. In a cutting machine, a frame having a vertical guide, a slide in the guide and including upper and lower parts, driving means carried by the frame for reciprocating said upper part, a gag carried by the upper end of said lower part and normally spacing said parts, tension means tending to draw the lower part toward the upper part, means for retracting the gag so that the tension means may be effective to move the lower part toward the upper part, a punch tool operatively connected to the lower part, a die carried by the frame and cooperating with the tool, said guide being open at its front side to provide for removal as a unit of the slide and the parts carried thereby, and retaining means carried by the frame and normally effective to hold the slide in the guide and adjustable to provide for removal of the slide.

19. In a cutting machine, a frame having a vertical guide and a cylindrical ram bore arranged therebelow, a slide in the guide and including upper and lower parts, means for reciprocating the upper part, a gag normally interposed between the parts, tension means tending to draw the lower part toward the upper part, a ram fitting the ram bore, a swivel connection between the upper end of the ram and the lower end of said lower part, a punch tool connected to the lower end of the ram, a die cooperating with the tool, and means for turning the ram about its longitudinal axis.

CHARLES B. GRAY.